M. H. SPIELMAN.
ELECTRIC POWER MECHANISM.
APPLICATION FILED SEPT. 8, 1919.

1,380,162.

Patented May 31, 1921.
4 SHEETS—SHEET 1.

Fig. 1

Inventor
Milton H. Spielman
By Baker & Macklin,
Attorneys

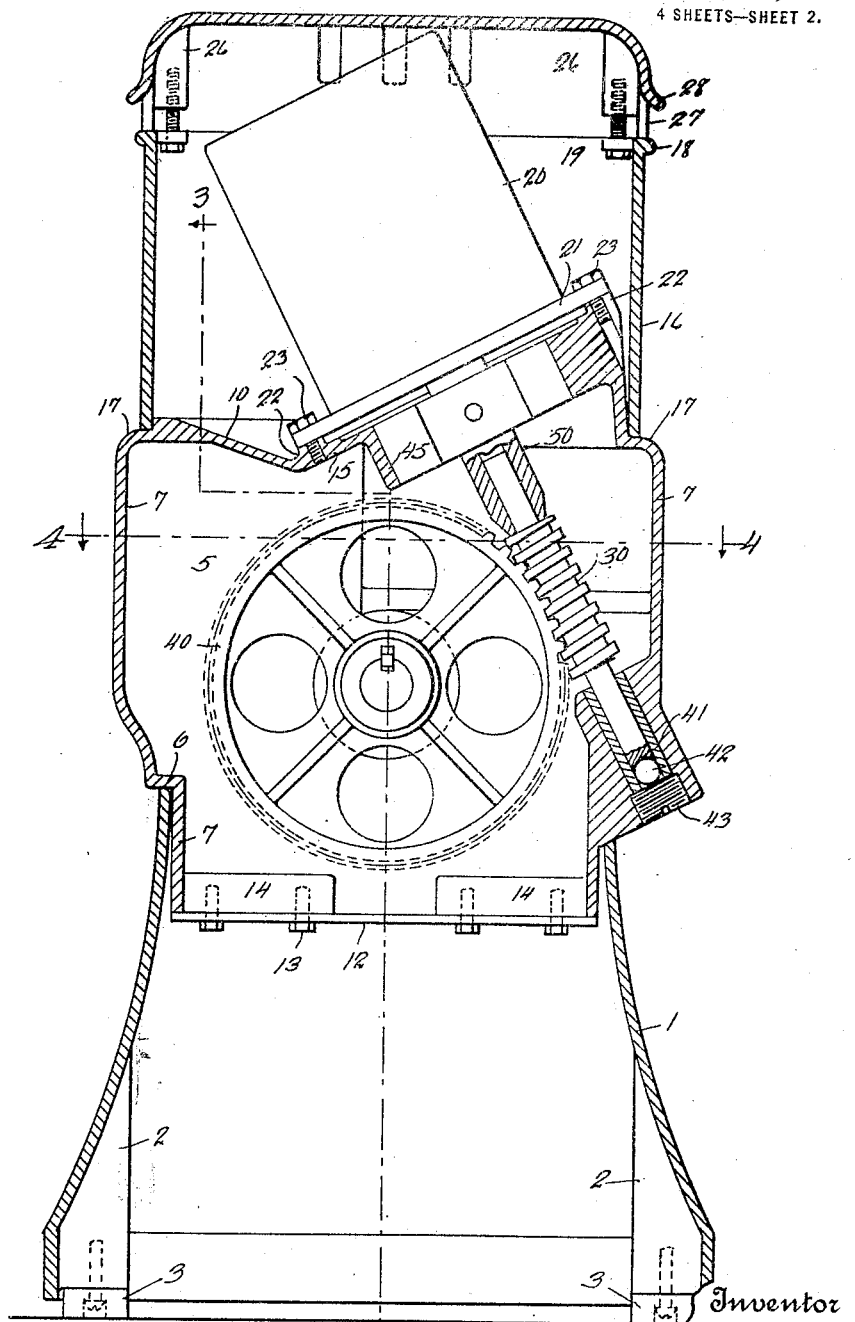

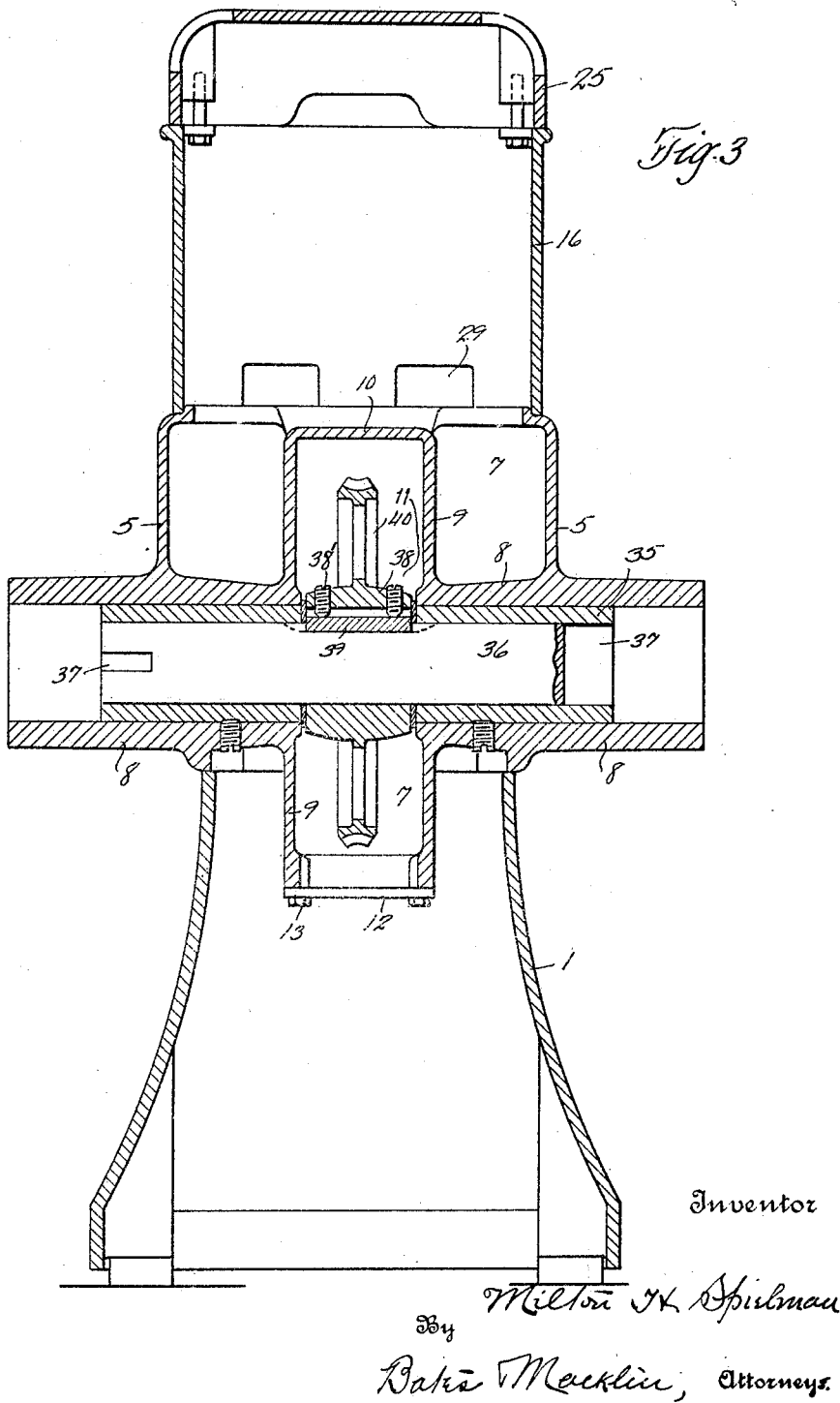

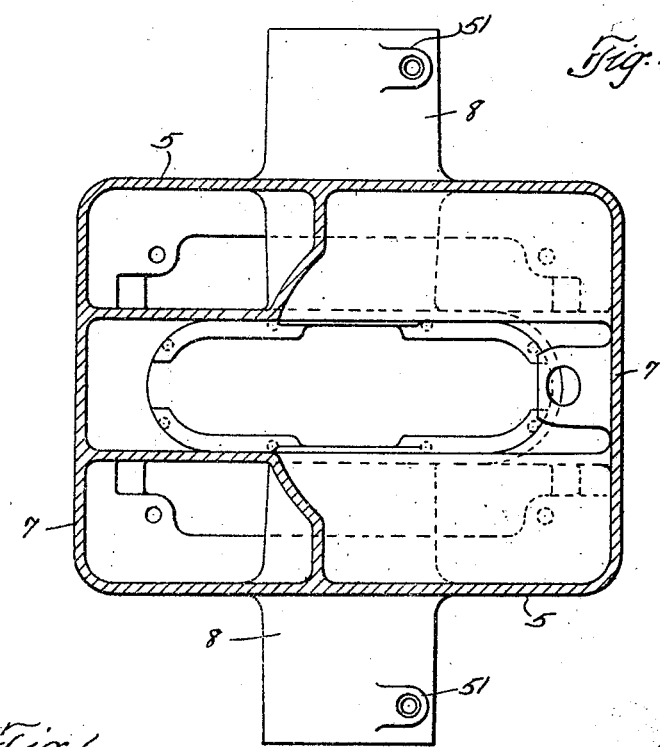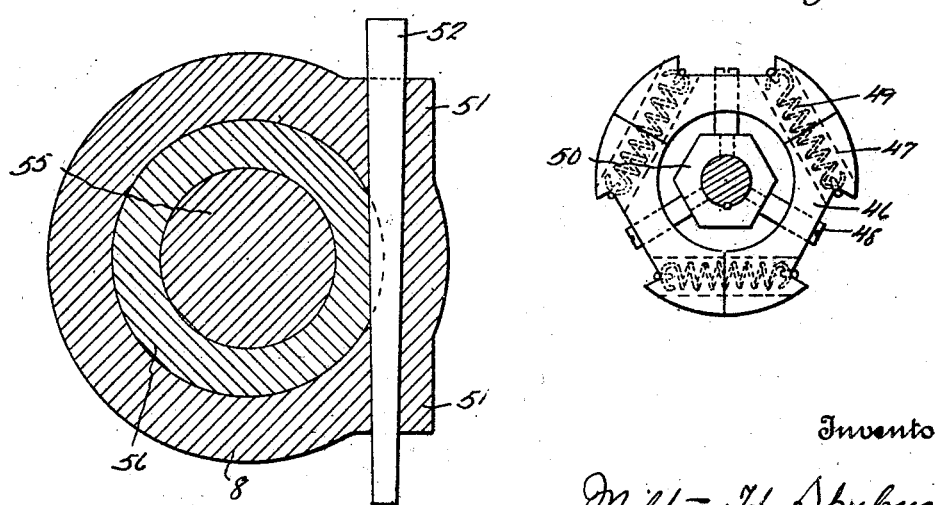

UNITED STATES PATENT OFFICE.

MILTON H. SPIELMAN, OF CLEVELAND, OHIO.

ELECTRIC POWER MECHANISM.

1,380,162.  Specification of Letters Patent.  Patented May 31, 1921.

Application filed September 8, 1919. Serial No. 322,593.

*To all whom it may concern:*

Be it known that I, MILTON H. SPIELMAN, a citizen of the United States, residing at Cleveland, in the county of Cuyahoga and State of Ohio, have invented a certain new and useful Improvement in Electric Power Mechanism, of which the following is a full, clear, and exact description, reference being had to the accompanying drawings.

This invention relates to an electric power mechanism suitable for use in a store or home for driving various devices, as a meat chopper, grinder and the like. The essential objects are to provide a mechanism in the nature of a power unit which shall be neat in appearance, small and compact in proportion to the power delivered, having unique and effective means for lubrication as well as ventilation of the motor. Still another object is to provide a convenient and novel method of removably attaching the devices such as meat choppers, coffee grinders, emery wheels and the like to the driving shaft of this power mechanism whereby they may be carried by the same stand in which the motor is mounted.

Heretofore many practical difficulties have been encountered in the application of small series motors to devices of this kind because of the irregularity of power requirements; for example, with a meat chopper, the load varies frequently from full load to no load and the speed of such motors tends to vary greatly in relation to the load delivered. The use of such a motor has many advantages, however, including compactness, and universal characteristics, whereby it is adapted to run on either alternating or direct current with high efficiency of power for the size of the motor.

I am aware that the application of such a motor for this use is not novel in itself but the method of applying it and accomplishing efficient results in a practical way has involved considerable invention and expensive experiments, the results of which are shown as embodied in the device illustrated in the drawings and specifically described in the following specification. The essential characteristics of this invention are summarized in the claims.

In the drawings Figure 1 is a side elevation of my invention shown as fitted to a meat chopper and an emery wheel, on the ends of the drive shaft respectively; Fig. 2 is a vertical section through the power stand showing the arrangement of the motor, worm wheel and worm; Fig. 3 is a vertical section taken on a plane substantially parallel with the axis of the drive shaft; Fig. 4 is a sectional plan view of the casing by which the motor and drive shaft are carried; Fig. 5 is a detail of the centrifugally expansible governor for the motor to prevent racing; Fig. 6 is a transverse section through the securing device for holding the meat chopper or similar mechanism to be driven by the power device in position on the stand.

In the construction of such device, it is desirable to have a stand of such size, weight and shape that it may be conveniently placed upon a bench or table to occupy but little room and it is further desirable that it be neat in appearance. To use a worm on the armature shaft of a motor and a worm wheel on a transverse shaft carried by the stand by the usual methods of design requires that the motor project unduly in a lateral direction. I have avoided this difficulty and have accomplished the above mentioned objects by a neat design of motor, a motor mounting and housing constructed substantially as follows:

Referring to the drawings: 1 indicates a substantially rectangular base member formed in the nature of a hollow box-like casing provided with bosses 2 to which suitable resilient pads 3 may be secured just within the corners of the box. The side walls of the member are curved inwardly on all sides and at their upper edges embrace and support an intermediate frame casing 4.

The casing 4 is formed in a peculiar manner, preferably as one integral casting. It has four vertical outer walls 5 and 7, giving it a rectangular box-like form; two tubular bearing members 8 alined with each other and extending inside and outside of the walls 5; two inner vertical walls 9 joining the inner ends of the bearing members and connected by the end walls 7, and a top portion 10. The lower portions of the walls 5 and 7 curve inwardly slightly and join abrupt horizontal shoulders at 6 which rest upon the side walls of the casing 1. The portions of the walls 7 below the bearing members 8 are narrower than the portions above, being of such width as to join the edges of the walls 9. These narrower portions at their outer sides abut inner faces of opposite walls of the base casing 1. The walls 9, together with the end walls 7 joining them, and the top portion 10 form a chamber 11 for a purpose hereinafter described. The lower end of this chamber is closed by the removable plate 12 preferably secured to the lower edge of the walls 9 and 7 by screws 13 engaging the bosses 14 formed in the wall members 7. This plate is readily accessible for removal, but is entirely housed and hidden within the base member 1.

The construction of walls described makes an effective bracing for the tubular members 8, which carry the bearings as hereinafter described. The top portion 10 of the inner chamber is extended diagonally as shown in Fig. 2, and is formed into an annular base 15, thus providing a seat for the motor 20.

Fixed to the end of the casing of the motor 20 is a base plate 21 which is secured by bolts or screws 23 to bosses 22 projecting from the base 15. The base 15, and the motor secured thereto are inclined from the horizontal to permit a worm 30 on an extension of the armature shaft to engage a worm gear 40 centrally located in the chamber 11. Surrounding the motor is a substantially rectangular open-ended housing 16 whose walls rest on horizontal shoulders 17 formed in the upper end of the frame casing 5. The upper end of the housing 16 is provided with a flange 18 on which rests a top casing or cover 25 having bosses 26 integral therewith secured to inwardly extending lugs 19 at the top of the housing 16. The cover walls are provided with ventilating openings 27 protected by outwardly curved integral portions 28 which also serve as convenient handles for removing the cover 25. The housing 16 may also be provided with additional openings for purposes of ventilation, such openings being shown at 29.

Mounted in the laterally projecting bearing members 8 are sleeves or bushings 35 in which is journaled a power shaft 36 having slotted ends as at 37 to receive the tongued ends of the stub shafts of the various devices which may be driven by the motor 20. The bearing members 8 extend beyond the ends of the power shaft forming supports for the driven stub shafts.

Fixed to the shaft 36 within the chamber 11 is the worm gear 40, which is engaged and driven by the worm 30 positioned angularly within the housing members as described. The gear 40 may be secured to the shaft 36, to drive the same, by screws 38', passing through a hub 38 and adapted to engage a key 39' in a corresponding keyway in the hub and move the same into a keyway or groove 39 in the shaft. The lower end of the inclined armature extension shaft carrying the worm 30 is provided with an internal conical bearing surface 41 adapted to roll on a ball 42 adjustably secured in position by a screw plug 43 in an inclined bearing integrally formed in the wall 7.

The lower portion of the rectangular chamber 11 formed by the rectangular walls 7 and 9 is preferably filled with oil in which revolves the gear 40, whereby proper and constant lubrication of the gearing may be obtained.

The annular base 15 for the motor is provided with a depending flange 45 constituting a housing for a governor mechanism 46, which latter is illustrated in detail in Fig. 5. The governor may consist of a hub 50 surrounding the extension from the armature shaft and from which radiate pins 48 slidably receiving through centrally positioned openings centrifugal members 47 interconnected by springs 49 preferably helical as shown.

At 59, 60 I have illustrated a meat chopper and grinder respectively, supported and driven, but it will be understood that other devices of various kinds may be so connected with my power unit. Each device is provided with a shaft 55 having a tongued end to engage the slots 37 in the ends of the power shaft and is surrounded by a sleeve or bushing 56. The shafts 55 and bushings 56 are inserted into the projecting ends of the bearing members 8 and brought into engagement with the ends of the shaft 36 and bushing 35 respectively, where they may be removably secured. To accomplish this, I have provided near each end of the bearing members 8 bosses 51 arranged at one side in pairs and provided with openings extending through the bearing members 8 and bushings 56, through which may be inserted tapered pins, thereby locking the driven devices to the power shaft.

A suitable switch may be provided in the base 1, having leads 57 and push buttons 58 whereby the motor may be connected and controlled from any available source of power.

It will be apparent from the foregoing description that a maximum gear reduction is obtained in a minimum space by virtue of the worm gearing employed and the inclined mounting of the motor shaft. By the provision of the centrifugal governor described, racing of the motor on low or zero loads will be prevented and practically constant speed on all loads assured. The lubricating and ventilating means provided prevent undue wear and overheating of the moving parts. By the large gear reduction provided and arranged as described a small high speed series motor may be used to deliver power to various machines at much lower and constant speed. The entire mechanism is embodied in a highly practical and efficient self-contained and compact device.

I claim:

1. A power plant comprising a housing having a plurality of rectangular portions, one of said portions constituting a base, a power shaft extending laterally from one of the portions, a motor having an inclined armature shaft within one of the portions and connected with the power shaft, said motor and power shaft being disposed one above the other.

2. A power plant comprising a housing having a plurality of portions, one of said portions constituting a base, a power shaft extending laterally from a housing portion above said base, and a motor within a top housing portion for driving said power shaft.

3. A power plant comprising a housing having a plurality of substantially rectangular portions, one of said portions constituting a base, a power shaft extending laterally from a housing portion above said base, and having a gear thereon, and a motor within a top housing portion, said motor having an inclined armature shaft and a gear on said shaft meshing with said first named gear.

4. In mechanism of the class described, a housing having a plurality of substantially rectangular portions, comprising a base, a power shaft casing and a motor casing, a power shaft having a centrally positioned gear fixed thereon, a centrally positioned motor incased in a housing portion above the power shaft, the prolongation of the armature shaft thereof having a gear thereon in meshing engagement with said first named gear.

5. In a power device, a housing, a power shaft horizontally arranged in said housing, a motor geared to said shaft for driving the same, said housing having laterally extending bearings in which the power shaft rotates and projecting beyond the ends of said power shaft, driven devices having a supporting and driving connection with said power shaft within said bearings.

6. In a power device, a housing, a power shaft horizontally arranged in said housing, a motor geared to said shaft for driving the same, said housing having laterally extending bearings rigid therewith receiving said power shaft and projecting beyond the ends thereof, driven devices having stub shafts and sleeves for insertion in said bearings, said power shaft and stub shafts having coacting tongue and groove ends.

7. In a power device, a housing, a power shaft horizontally arranged in said housing, a motor geared to said shaft for driving the same, said housing having laterally extending bearings rigid therewith and projecting beyond the ends of said power shaft, driven devices having a supporting and driving connection with said power shaft within said bearings and detachable means for retaining said driven devices in driving relation with said power shaft.

8. In a power device, a housing, a power shaft horizontally arranged in said housing, a motor geared to said shaft for driving the same, said housing having laterally extending bearings rigid therewith and projecting beyond the ends of said power shaft, driven devices having stub shafts and sleeves for insertion in said bearings, said power shaft and stub shafts having coacting tongue and groove ends, detachable means for rigidly supporting and retaining said driven devices in said bearing members in driving relation with said power shaft.

9. In a power unit, a housing therefor comprising a base, a gear casing, and a motor casing, all substantially rectangular and arranged successively in superimposed relation, said gear casing having shaft bearing members and a centrally positioned oil chamber connected thereto.

10. In a power unit, a casing comprising a substantially rectangular open-ended frame having alined tubular bearing members projecting through two opposite walls, a vertical pair of walls extending between the other two opposite walls having openings surrounded by said bearing members, and top and bottom portions, one being separably connected with said vertical pair of walls.

11. In a power unit, a casing comprising an open-ended frame having alined tubular bearing members projecting through two opposite walls, a vertical pair of walls extending between the other two opposite walls having openings surrounded by said bearing members, a bottom portion coacting with the walls to provide an oil receptacle, a shaft within said bearings, a gear fixed on said shaft within said receptacle, and a motor mounted on said casing for driving said gear and shaft.

12. In a power unit, a housing therefor comprising a base, a gear and shaft casing, and a motor casing, all substantially rectangular and arranged in superimposed relation, said gear and shaft casing having alined bearing members projecting through opposite walls, and a gear chamber integrally connecting the inner ends of said bearing members.

In testimony whereof, I hereunto affix my signature.

MILTON H. SPIELMAN.